Feb. 4, 1941.  A. W. NEITZKE  2,230,900
TREE LIGHTING OUTFIT
Filed Nov. 13, 1939  2 Sheets-Sheet 1
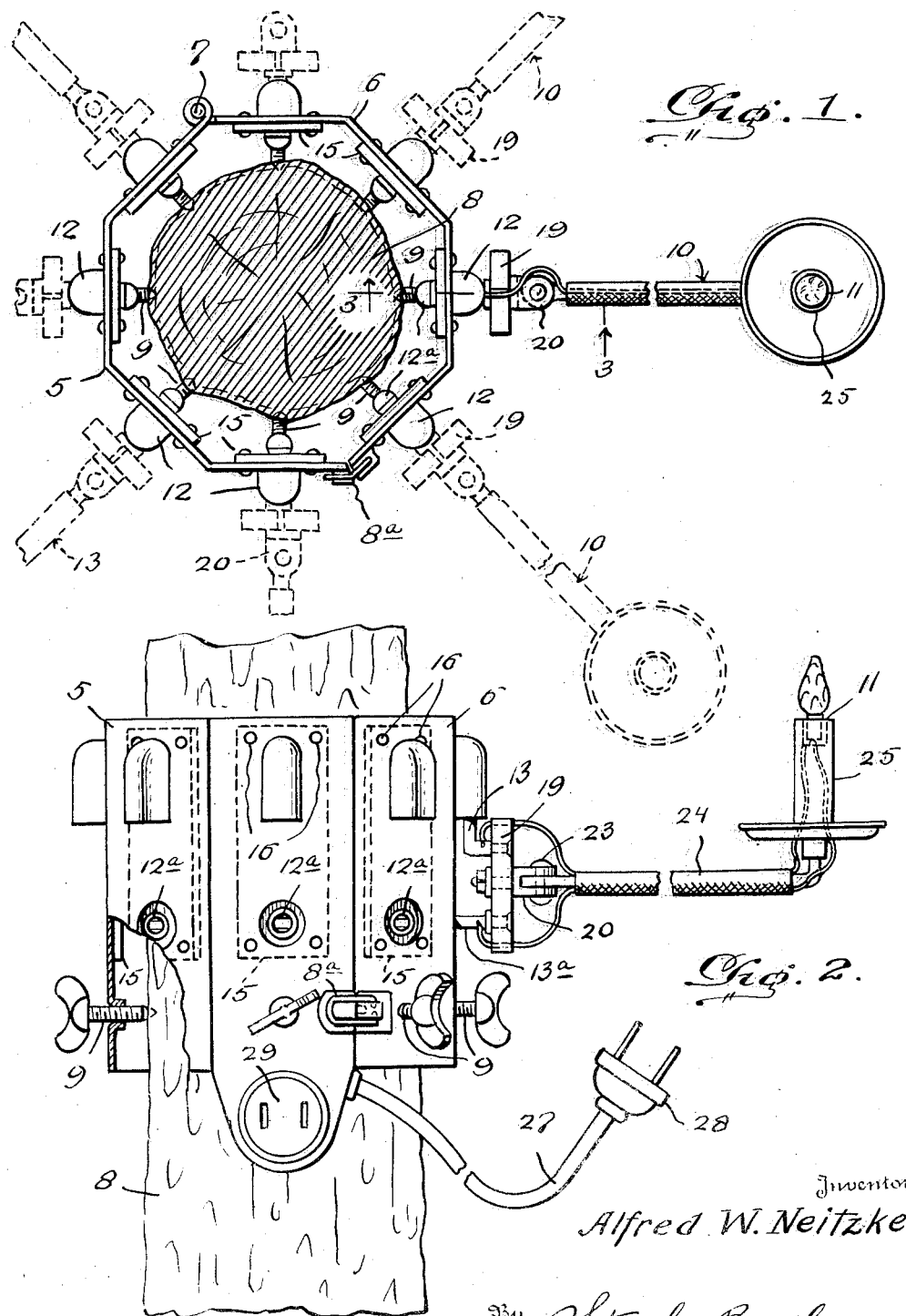
Inventor
Alfred W. Neitzke, Feb. 4, 1941. A. W. NEITZKE 2,230,900
TREE LIGHTING OUTFIT
Filed Nov. 13, 1939  2 Sheets-Sheet 2
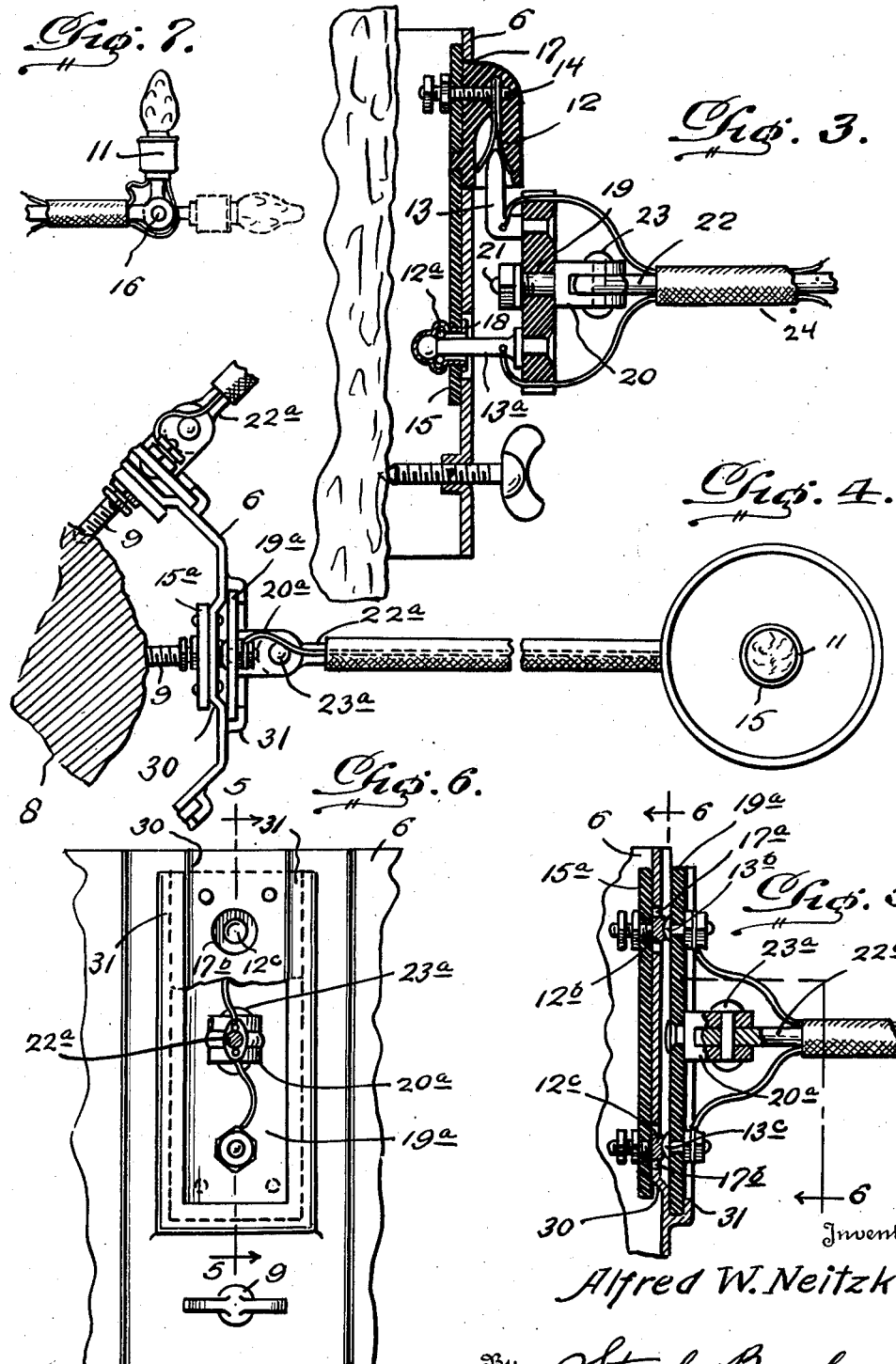
Inventor
Alfred W. Neitzke,
By J. Stanley Burch
Attorney Patented Feb. 4, 1941

2,230,900

UNITED STATES PATENT OFFICE 2,230,900

TREE LIGHTING OUTFIT

Alfred W. Neitzke, Chicago, Ill.

Application November 13, 1939, Serial No. 304,234

2 Claims. (Cl. 240—10)

This invention relates to a novel decorative lighting outfit for Christmas trees, for use in lieu of the usual lighting outfit consisting of flexible wires having electric lamps arranged along the same at intervals and connected in parallel or in series.

In using the usual lighting outfit of this kind, it is somewhat inconvenient and difficult to distribute the lamps with respect to the tree, and they are likely to readily become disarranged. Accordingly, an object of the present invention is to provide a tree lighting outfit adapted to overcome these and other objections to the usual lighting outfits.

In carrying out the present invention, there is provided a holder to embrace the tree trunk, and lamp brackets extend from the holder at different points radially thereof, the lamp brackets having lamp sockets at the outer ends thereof connected in series or in parallel as desired. The lamp brackets are preferably capable of lateral or horizontal swinging movement relative to the holder so that they can be positioned according to the decorator's taste. Also, the lamp brackets are preferably detachable from the holder so as to facilitate application of the outfit to the tree by first applying the holder and then engaging the lamp brackets with said holder. This also enables the outfit to be readily knocked down so that the same may be stored in small compass when not in use.

With the above and other objects in view, the present invention consists in the novel form, combination and arrangement of parts hereinafter more fully described, shown in the accompanying drawings and claimed.

In the drawings:

Figure 1 is a top plan view of a tree lighting outfit constructed in accordance with the present invention and shown applied to the trunk of a tree.

Figure 2 is an elevational view thereof, partly broken away and in section.

Figure 3 is a fragmentary vertical section taken on line 3—3 of Figure 1.

Figure 4 is a fragmentary plan view showing a modified form of the invention.

Figure 5 is a vertical section on line 5—5 of Figure 6 and illustrating details of the embodiment shown in Figure 4.

Figure 6 is a section on line 6—6 of Figure 5; and

Figure 7 is a fragmentary elevational view illustrating a modified form of lamp bracket.

Referring in detail to the drawings, the present tree lighting outfit includes a holder which preferably consists of a clamping sleeve formed of two half sections 5 and 6 hinged together along corresponding vertical edges as at 7 and separably connected along their remaining vertical edges as at 8a. In this way, the holder may be swung open so as to be readily placed about the tree trunk 8 at the desired elevation, after which the sections of the holder may be swung together and fastened in closed condition. The holder may be firmly secured in place on the tree trunk by suitable means such as set screws 9 passing through and having threaded engagement with the holder at certain intervals and arranged to be threaded inwardly to impinge the tree trunk as shown clearly in the several views.

The device further includes a plurality of similar lamp brackets 10 extending from the holder at different points radially of the later, each lamp bracket having a lamp socket 11 at the outer end thereof, and the lamp sockets of the several lamp brackets being connected in series or in parallel as desired.

As shown, the lamp brackets 10 are detachable from the holder, and in the embodiment of Figures 1 to 3 inclusive, the holder is formed of sheet metal with portions thereof bent at angles to each other so as to provide the holder with angularly related portions from each of which the respective lamp brackets extend. Each angular portion of the holder is provided with a pair of contacts 12 and 12a adapted to be respectively engaged by the contact pins 13 and 13a of the associated lamp bracket. The contact 12 may be suitably disposed within a recess member 14 of insulating material and exposed through the bottom of the latter, while the contact 12a is preferably in the form of a resilient socket carried by the lower end portion of a plate of insulating material 15 riveted or otherwise fastened as at 16 to the inner face of the holder. The holder has openings at 17 and 18 through which the contact carrying member 14 projects and through which the contact 12a is exposed, respectively. The contacts 12 and 12a will of course be suitably wired within the holder as will be apparent to those skilled in the art.

Each lamp bracket 10 preferably consists of a vertical plate 19 of insulating material having an angular inwardly projecting contact pin 13 arranged to engage a contact 12 and the straight contact 13a having a ball-shaped or headed free end adapted to engage in the adjacent resilient socket contact 12a. A hinged member 20 has a stem 21 on which the insulating plate 19 is fastened, and the inner end of a rod 22 is pivoted to the hinged member 20 as at 23. The lamp socket 11 is carried by the outer end of this rod 22, and the wires extending from the contact pins 13 and 13a to the associated lamp socket 11 are preferably extended along the rod 22 and suitably wrapped as at 24. The lamp socket 11 may form part of a candle-simulating lamp unit 25 rigid with and projecting upwardly from the outer end of the rod 22 as shown in Figures 1 and 2, or may be hingedly mounted on the outer end of the rod 22 for vertical swinging adjustment as indicated at 26 in Figure 7. In the latter instance, the lamp socket may be positioned to project upwardly as shown by full lines or to extend horizontally outwardly as indicated by dotted lines, to obtain different decorative effect. It will be seen that when a plurality of the lamp brackets are engaged with the holder, the lamp sockets thereof will be electrically connected in series or in parallel according to the method followed in wiring the contacts 12 and 12a together. Current may be conveyed to the holder by means of an electrical attachment cord 27 leading to the wiring of the contacts 12 and 12a and having an attachment plug 28 on the outer end thereof adapted for reception in an outlet receptacle or wall plug of a house wiring system.

By providing the contact 12 in a recessed member 14 so as to be exposed through the bottom of the latter, foreign material is not likely to find its way into said member 14 for fouling the contacts 12. The holder also preferably has an outlet receptacle 29 connected with the wiring between the contacts 12 and 12a so that current may be supplied from one holder to another in case a plurality of the outfits are employed at different elevations upon the same tree, the several outfits being thereby connected in series.

It will of course be understood that the arrangement of contacts for detachably connecting the lamp brackets to the holder is capable of considerable change or modification. One such modification is illustrated in Figures 4 to 6 inclusive wherein an insulating plate 15a is secured on the inner face of each angular portion of the holder and has ordinary headed contacts 12b and 12c exposed through openings in the holder at 17a and 17b. The adjacent portion of the holder to which the plate 15a is attached is offset inwardly as at 30, and provided on the outer face of the holder in surrounding relation to this inwardly offset portion 30 is a flanged guideway open at the top and closed at the bottom as clearly illustrated in Figures 5 and 6 arranged to receive a vertically elongated plate of insulating material 19a carrying contacts 13b and 13c arranged to respectively engage the contacts 12b and 12c when the plate 19a is engaged in said guideway 31. The lamp brackets, in this embodiment include a hinged member 20a having a stem on which the plate 19a is secured and to which hinges the rod 22a of the lamp bracket as at 23a. The lamp bracket is otherwise of the same construction as shown and described with respect to Figures 1 to 3 inclusive, and it will be noted that the hinge at 23 or 23a permits lateral or horizontal swinging of the outer portion of the lamp bracket relative to the holder so as to provide for ready arrangement of the lamp bracket according to the decorator's taste.

It will be seen that after applying the holder to the tree trunk, the lamp brackets may be readily engaged with the holder and properly adjusted, after which the attachment plug 28 of the holder may be readily engaged in an outlet receptacle so as to supply current to the lamps in the sockets 11 of the lamp bracket. Conversely, when the outfit is no longer required for use, the lamp brackets may be readily detached from the holder and the holder may be readily disengaged or removed from the tree trunk. The outfit may then be readily stored compactly until desired for use again. It will be seen that the present invention overcomes the mentioned objections to ordinary decorations of this kind, as well as presenting improvements and advantages thereover.

What I claim as new is:

1. A tree lighting outfit comprising a holder formed to embrace the tree trunk and having pairs of contacts at different points radially thereof, a plurality of lamp brackets detachably engaged with the holder and having contacts engaged with and quickly detachable from the contacts of the holder, an attachment cord for supplying electric current to the contacts of the holder from an outlet receptacle of a house wiring system, each lamp bracket including an inner member carrying the contacts of the lamp bracket and an elongated outer member hinged to the inner member for horizontal swinging movement, whereby the outer members of the lamp brackets may be adjusted to different positions relative to the holder.

2. A tree lighting outfit comprising a holder in the form of a sheet metal sleeve adapted to embrace the tree trunk, said sleeve being of polygonal form and having pairs of contacts on the angular portions thereof, a lamp bracket detachably carried by each angular portion of the sleeve and having contacts engaging the associated contacts of the latter, means to convey current to the contacts of the sleeve, and means to secure the sleeve rigidly with respect to the tree trunk, said lamp brackets having lamp sockets at the outer ends thereof.

ALFRED W. NEITZKE.